United States Patent [19]
Yamazaki et al.

[11] Patent Number: 6,130,672
[45] Date of Patent: Oct. 10, 2000

[54] IMAGE PROCESSING APPARATUS

[75] Inventors: Shoichi Yamazaki, Yokohama; Shunichi Tamai, Chiba; Hirokazu Akisada, Tokyo, all of Japan

[73] Assignee: Canon Kabushiki Kaisha, Tokyo, Japan

[21] Appl. No.: 08/837,214

[22] Filed: Apr. 22, 1997

[30] Foreign Application Priority Data

Apr. 24, 1996 [JP] Japan ................................. 8-102497

[51] Int. Cl.$^7$ ...................................................... G06T 7/00

[52] U.S. Cl. ........................... 345/427; 345/166; 345/167; 345/421

[58] Field of Search ................................... 345/423, 427, 345/419, 421, 426, 166, 167

[56] References Cited

U.S. PATENT DOCUMENTS

| | | | |
|---|---|---|---|
| 4,857,902 | 8/1989 | Naimark et al. | 345/167 |
| 5,710,875 | 1/1998 | Harashima et al. | 345/419 |
| 5,819,016 | 10/1998 | Watanabe et al. | 345/419 |

*Primary Examiner*—Mark K. Zimmerman
*Assistant Examiner*—Kimbinh T. Nguyen
*Attorney, Agent, or Firm*—Fitzpatrick Cella Harper & Scinto

[57] ABSTRACT

In a viewpoint detector instructions for a virtual 3-dimensional space are processed by an image processor. A virtual 3-dimensional spatial image is displayed in a field of view, and a viewpoint position of an operator in the field of view is detected. The 3-dimensional spatial image is displayed, and an image process for changing the image in accordance with the detected viewpoint position and an observation time is executed.

35 Claims, 15 Drawing Sheets

IMAGE PROCESSING APPARATUS

BACKGROUND OF THE INVENTION

1. Field of the Invention

The invention relates to an image processing apparatus which is suitable when using, for example, instructing means such as a viewpoint detection device or the like.

2. Related Background Art

In recent years, the realization of a high performance computer and an image processing apparatus is remarkable, and a high speed and advanced image process using the computer is widely used in every associated field.

Particularly, in recent computer image processes, there is a method such that a virtual 3-dimensional space is formed in the computer and the operator can freely move and view in the space.

According to the above method, a viewpoint is virtually set to a certain location in the virtual 3-dimensional space and a scene which is seen each time the virtual viewpoint is moved or rotated is calculated and drawn on a display.

Hitherto, as a device for instructing (namely, pointer) the movement of the viewpoint, there is a mouse, a track ball, a space ball, a data glove, a magnetic sensor (which is adhered to a human body and moves in an actual space), a pressure sensor, or the like.

In a game in which a viewpoint is moved in a space like a maze or the like, there is an apparatus such that a whole or partial plan view/cross sectional view is displayed and a locus passing through is drawn by straight lines, continuous points, a free curve, or the like. Such an apparatus is useful to recognize the present position in a whole or partial map or the like.

Although not a 3-dimensional space display system, there is an apparatus in which a viewpoint detection is used for an automatic focusing of a camera. According to such an apparatus, the direction in which the eyeball looks on a finder of the camera is detected and a focal point is matched with the looking position of the eyeball.

However, in such a viewpoint detection optical system, since a dichroic mirror, a dichroic prism, and the like for transmitting or reflecting only an infrared ray are used, the finder increases in size and the costs also rise. Since the dichroic mirror, dichroic prism, and the like are arranged in the finder, a finder magnification or an eye point cannot help being sacrificed.

However, according to the method of setting the virtual viewpoint designated by the mouse, track ball, magnetic sensor, or the like mentioned above, an instructing method for moving the viewpoint in the virtual space departs from actually, resulting in a feeling of disorder.

In case of attaching magnetic sensors to several positions of the human body, although the virtual viewpoint can be instructed with the same feeling as the actual feeling, there are drawbacks such that a scale of group of sensing devices is large and the costs are also high.

In case of the method of displaying the locus in the game or the like, although a present position can be confirmed in a 2-dimensional plane, it is difficult to display and confirm the position in a 3-dimensional space.

SUMMARY OF THE INVENTION

The invention is made to solve the above problems and it is a first object of the invention to provide an image processing apparatus using a viewpoint detection which can be realized at low cost without increasing a scale of apparatus by a method that is extremely close to an actual situation as an instructing method whereby a virtual 3-dimensional space changes in accordance with a 3-dimensional spatial viewpoint of the user in a display field of view.

It is a second object of the invention to provide an image processing apparatus using a viewpoint detection in which when moving on a virtual 3-dimensional space, as means for knowing a passing position, an image like a 3-dimensional map or a continuous image like a locus can be easily expressed and a video image with a high power of expression is displayed instead of a simple rectilinear locus.

It is a third object of the invention to provide an image processing apparatus using a viewpoint detection in which the viewpoint detection on a virtual 3-dimensional space can be performed by a compact viewpoint detection system at a high precision and low costs without losing a function of display means for displaying an image.

To accomplish the above objects, according to a preferred embodiment of the invention, there is provided an image processing apparatus using a viewpoint detection, comprising: display means for displaying a virtual 3-dimensional space image into a field of view; viewpoint detecting means for detecting a viewpoint position of the operator in the field of view; and image processing means for displaying an image on the display means and changing the image in accordance with the viewpoint position detected by the viewpoint detecting means.

The above and other objects and features of the present invention will become apparent from the following detailed description and the appended claims with reference to the accompanying drawings.

DETAILED DESCRIPTION OF THE PREFERRED EMBODIMENTS

The first embodiment of the invention will now be described hereinbelow with reference to the drawings.

Figure 1:
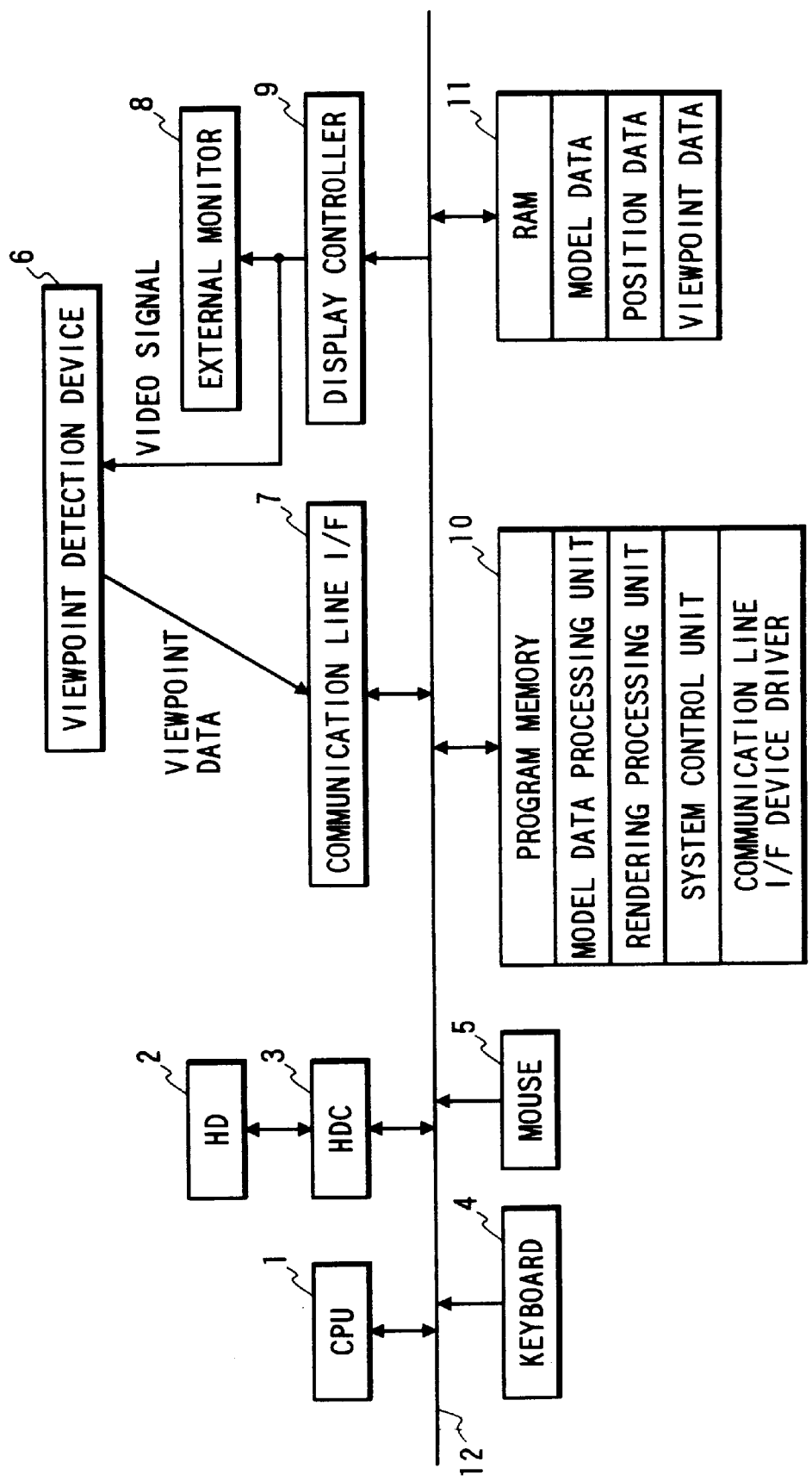
FIG. 1 is a block diagram showing a hardware construction of a computer according to the first embodiment of the invention.

FIG. 1 shows a hardware construction of the embodiment.

In the diagram, reference numeral 1 denotes a CPU (central processing unit) for controlling an entire system; 2 a hard disk drive unit serving as an external storage device; 3 a hard disk controller; 4 a keyboard serving as input means for inputting data and commands; and 5 a mouse likewise serving as input means. Those component elements are mutually connected by a common bus 12. This construction is a system construction which is generally seen in a personal computer.

Further, reference numeral 6 denotes a viewpoint detection device to detect an attention point position in a field of view of the operator. Reference numeral 7 denotes a communication line interface for transmitting viewpoint position data outputted from the viewpoint detection device 6 to the CPU 1 or a memory through the bus 12.

Reference numeral 8 denotes an external monitor for displaying various data, images, or the like and 9 indicates a display controller for performing a control to display a display image and various display data onto the external monitor 8 through the bus 12 and executing a signal conversion.

A display device for displaying image data supplied from the display controller 9 and a video signal to display icons such as menu, commands, and the like for viewpoint detection is arranged in the viewpoint detection device 6. The operator observes the icon for viewpoint detection while looking at the display screen, thereby enabling a function corresponding to the icon to be executed.

Reference numeral 10 denotes a program memory in which a predetermined program to make the system operative has been stored. The program memory 10 has therein: a system control unit for controlling the fundamental operation of the system; a model data processing unit for performing processes regarding model data of the image process; and a rendering processing unit for performing a drawing process of an image on the basis of information from the model data processing unit. The program memory 10 also has various control blocks, a communication line I/F (interface) for mutually connecting other apparatuses through the bus 12 and performing a data communication with the various apparatuses, and the like.

Reference numeral 11 denotes a RAM to store data such as model data as a target of the image process, position data in the picture plane of the image, viewpoint data detected by the viewpoint detection device 6, and the like.

Therefore, the system executes image processes by using the various data stored in the RAM 11 in accordance with the program which has been stored in the program memory 10 and which is used to execute various processes. According to the embodiment, the viewpoint position of the operator is detected for the image displayed in the picture plane, thereby changing the image in accordance with the viewpoint position and the observation time.

The processes which are executed in the system of FIG. 1 will now be described with reference to the flowchart shown in FIG. 2. The processes are carried out by executing the program stored in the program memory 10 by the CPU 1.

Figure 2:
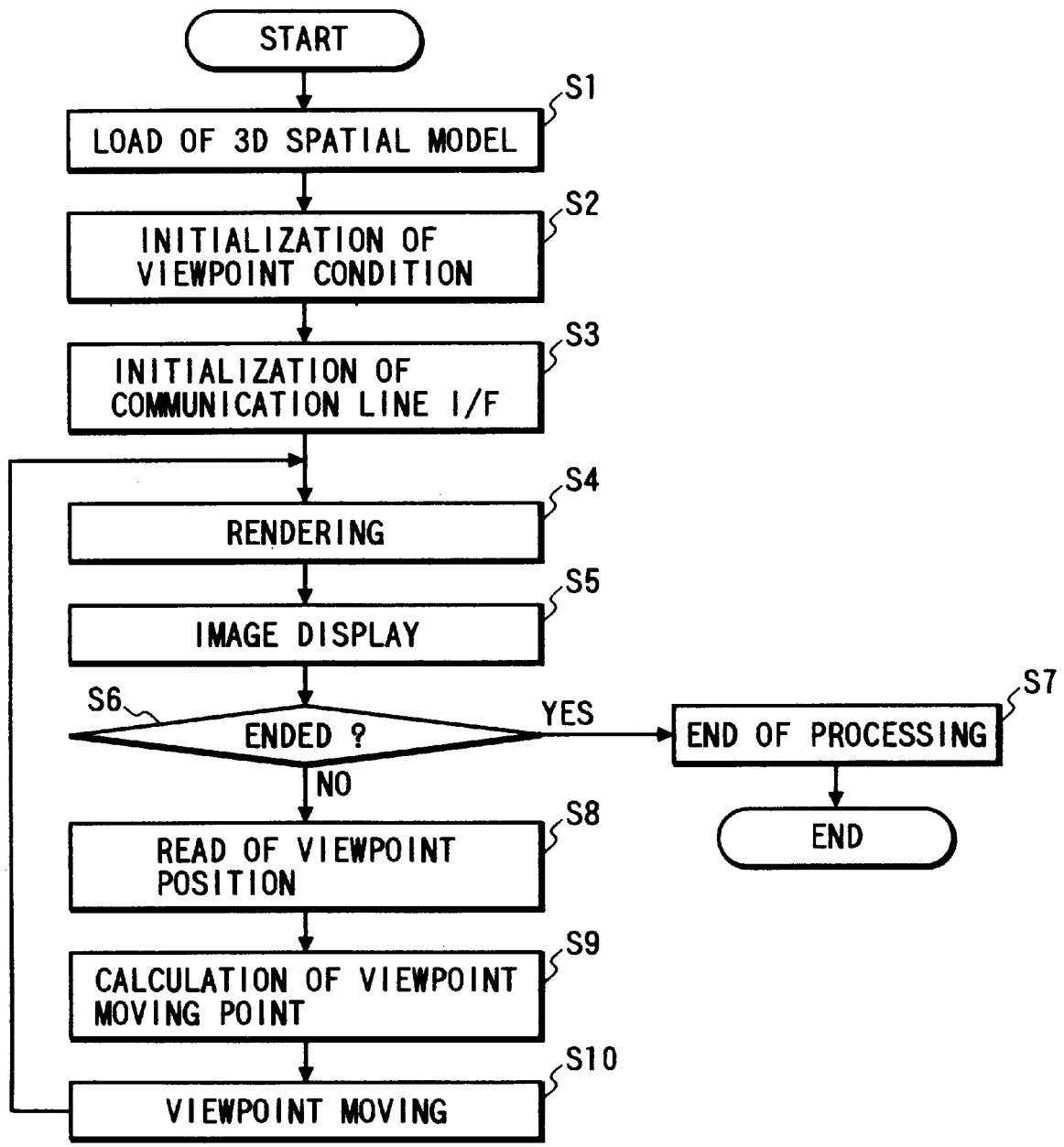
FIG. 2 is a flowchart showing processes in the computer according to the first embodiment of the invention.

In FIG. 2, when a processing routine is started, various application programs in the program memory 10 are activated.

In step S1, the model data expressing a 3-dimensional virtual space is read out from a hard disk HD. The model data processing unit in the program memory 10 develops the model onto the memory (RAM). Generally, the model is read around the origin of a world coordinate system as a center. Thus, a predetermined virtual spatial image is displayed in front of the operator and a 3-dimensional image is displayed.

In step S2, the viewpoint position (to be detected by the viewpoint detecting means) of the operator in the virtual space is initialized. For example, the viewpoint position is moved to a position which has previously been determined in the Z-axis direction in the world coordinate system. In this instance, a screen position (position where an image to be displayed in the actual display apparatus is formed) is preliminarily determined on the basis of a distance from the viewpoint and an angle of view.

Amounts of movement and rotation (unit amounts of displacement) of the viewpoint of every rendering are set in accordance with a volume of the loaded model. For example, when the model is loaded into (1.0, 1.0, 1.0) in the world coordinate system, the movement amount of the viewpoint in the virtual space is set to 0.01 and the rotation amount of the visual line is set to 0.2°. As a setting method here, they can be set in the system or the user can also input arbitrary values.

The unit displacement amounts are now set to (dD, dR).

In step S3, the communication line I/F is initialized (in the embodiment, for instance, RS232C is used and a port is opened, thereby setting the system into a communication possible state).

In step S4, the rendering processing unit in the program memory 10 performs a rendering in the program memory 10 for a start view, namely, to form an initial image at the time of start.

In step S5, the image rendered in step S4 is displayed on an external monitor and a display unit (not shown) in the viewpoint detection device 6 via a display controller. Thus, the image can be displayed for the operator (it is displayed by an external monitor for persons other than the operator).

In step S6, a check is made to see if the process is finished (as a signal for the end, it is sufficient to use an operation which can discriminate the end of process; namely, a timing when a special key of a keyboard is depressed; a timing when a right button of a mouse is depressed; a method whereby a time from the start is measured and the process is finished after the elapse of a predetermined time; a method whereby an external switch is provided for the viewpoint detection device and the process is finished when the switch is depressed; or the like).

When the finishing operation is performed in step S6, a finishing process is executed in step S7. In this case, processes such that the communication line is closed, the image under processing is stored into the hard disk HD, a memory area used in the RAM is opened to another process, and the like are executed.

When the finishing operation is not performed in step S6, in step S8, viewpoint position detection data (Xx, Yy) detected by the viewpoint detection device 6 is read into the RAM 11 from a communication I/F. Since the viewpoint position detection data in this instance is a coordinate value in the display/viewpoint detection system of the viewpoint detection device 6, it is normalized and converted into data (Xi, Yi) of the screen coordinate system indicative of an actual image processing space. The above data can be easily obtained by a ratio between each region in the X direction and Y direction of the viewpoint detection data and a display region of the screen. The observing time of the operator is also simultaneously detected.

In step S9, the movement amount of the viewpoint in the virtual space is calculated and the corresponding observation point on the screen is moved. As a calculating method, the visual line is rotated and moved in the viewpoint position (Xi, Yi) direction on the screen coordinate system by only a distance of dR around the present viewpoint position as a center. A vector of the visual line is calculated and the position which is away from the present viewpoint position on the visual line by the distance of dD (world coordinate system) is calculated, so that the movement position in the world coordinate system of the viewpoint can be obtained. The details of the calculation in this instance are omitted here because it can be calculated by a well-known 3-dimensional geometry and a perspective method. Thus, the position and displacement in the 3-dimensional world coordinates of the viewpoint position can be obtained.

In step S10, a rendering is performed at a new viewpoint position in order to draw a scene. On the screen (display picture plane), therefore, a target is naturally seen as if the operator approached the observing target (location) little by little.

Figure 3:
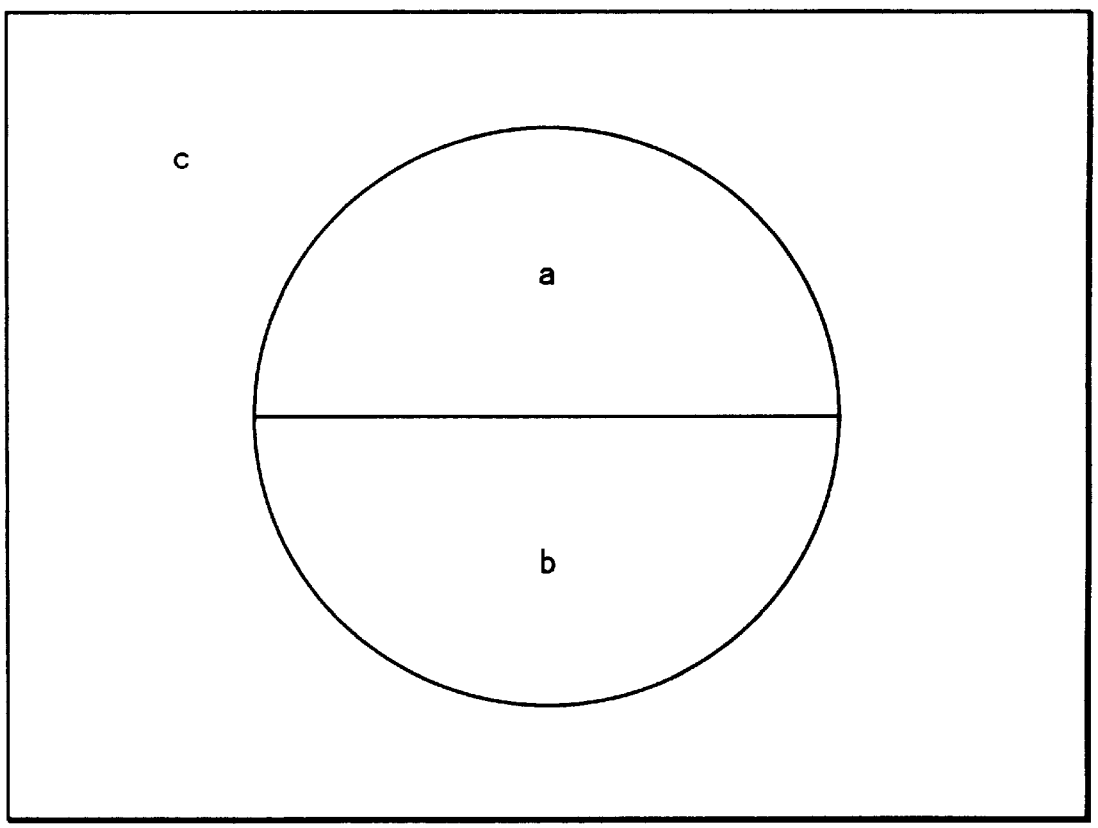
FIG. 3 is a diagram for explaining a division on a display picture plane.

In the present embodiment, although the viewpoint is always moved and rotated by an amount of a unit vector by every loop, for example, it is also possible to construct in a manner such that the screen is (purposely) divided as shown in FIG. 3 and the viewpoint position is moved in a different direction in accordance with the corresponding region. The image is changed in a rule such that when the detected viewpoint position arrives at a portion (a) in FIG. 3, the image is moved forward, namely, is enlarged, so that the image changes as if the distance from the target approached, and that when the viewpoint position arrives at a portion (b) in FIG. 3, the image is reduced as if it moved backward. It is also possible to use a viewpoint moving method such that when the viewpoint position arrives at a portion of (c) in FIG. 3, the direction of the image is rotated in accordance with the position in the picture plane.

Therefore, the image changes in accordance with the observation point position in the picture plane and the observation time. The observation time appears as a continuation time of a certain change of the image.

Figure 4:
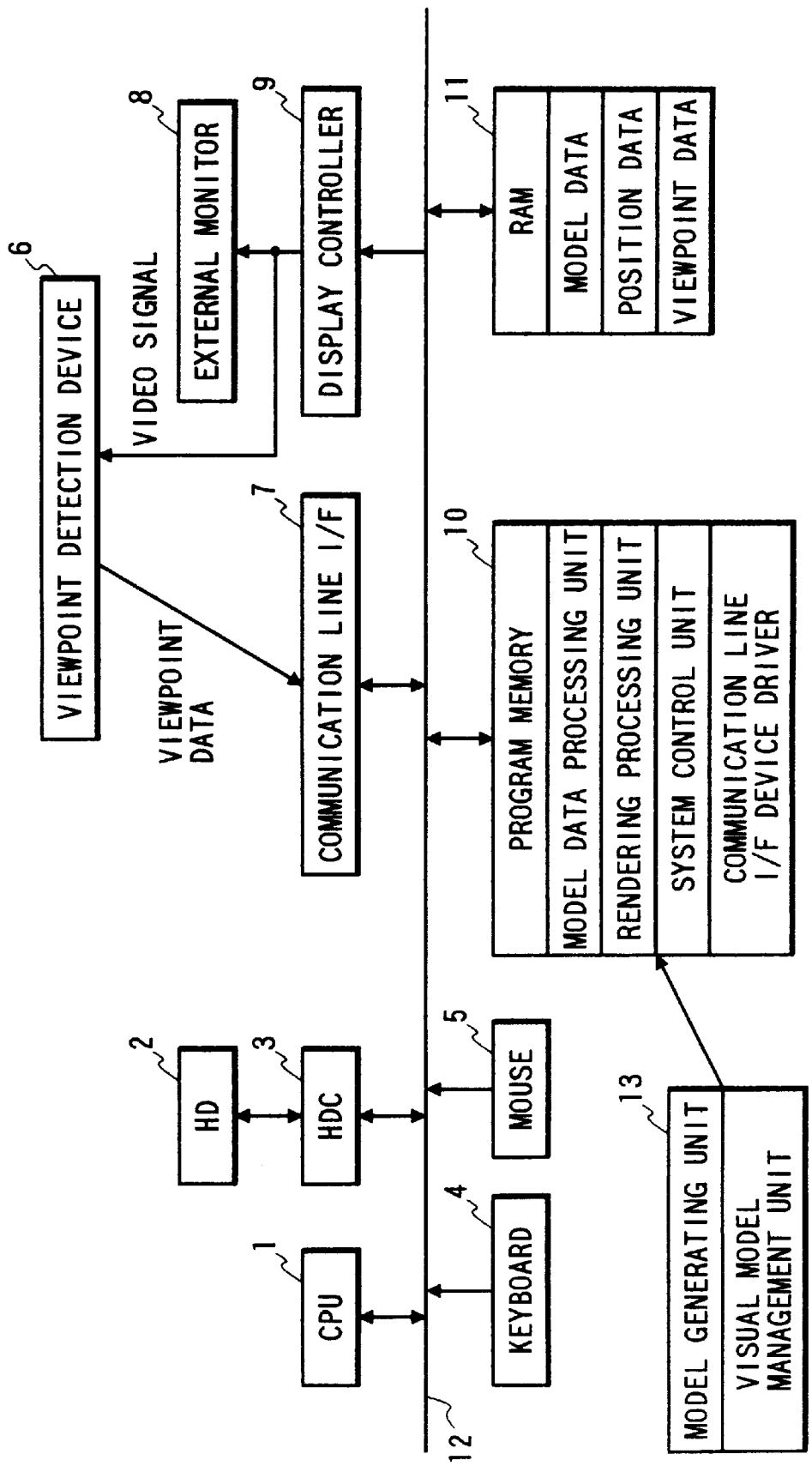
FIG. 4 is a diagram showing a hardware construction of a computer according to the second embodiment of the invention.

FIG. 4 now shows a hardware construction of the second embodiment and differs from the first embodiment 1 of FIG. 1 with respect to a point that a model generating unit 13 is newly provided.

Figure 5:
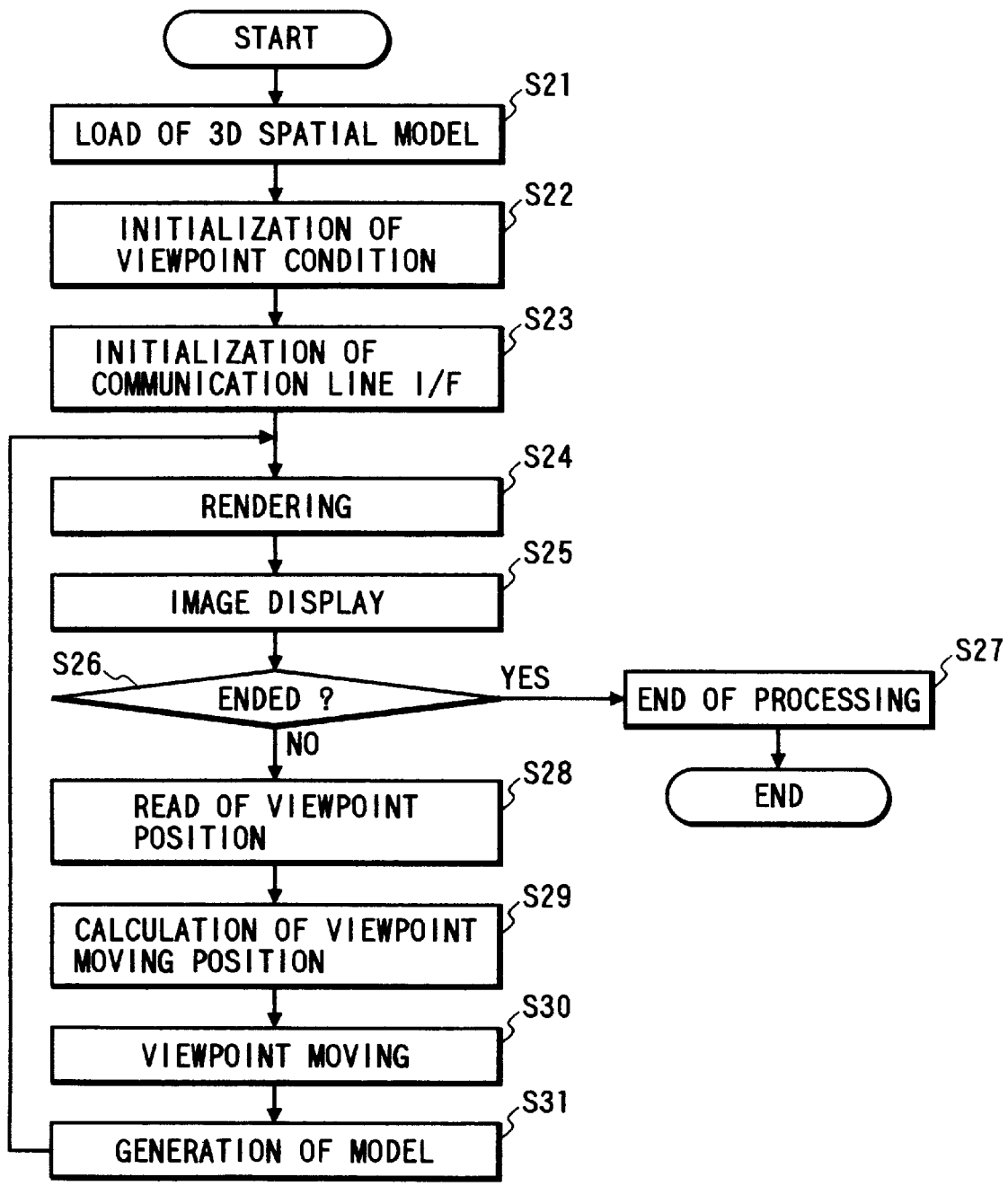
FIG. 5 is a flowchart showing processes in the computer according to the second embodiment of the invention.

FIG. 5 shows a whole flow of the embodiment. In the diagram, processes in steps S21 to S30 are similar to those in steps S1 to S10 of the flowchart of FIG. 2 except a different point that a process for generating a model in step S31 is added.

That is, after the viewpoint was moved in the virtual space, a new model is generated between the screen picture plane and a forward clipping surface (the model has a position as an initial value at a location near the forward clipping surface) on the visual line from the calculated new viewpoint position. The fundamental model data is previously stored in the RAM and prepared. According to experiments of the embodiment, a solid sphere was used. A size of sphere was determined in accordance with a volume (size which was adjusted by experiments) of spatial model data which was read for the first time. An image of the solid sphere stored in the RAM is newly generated in the viewpoint direction of the operator and is displayed as a growing image change.

As mentioned above, an effect such that the image change occurs in the observation point direction can be obtained. The embodiment is extremely effective means in the image process using viewpoint information.

Figure 6:
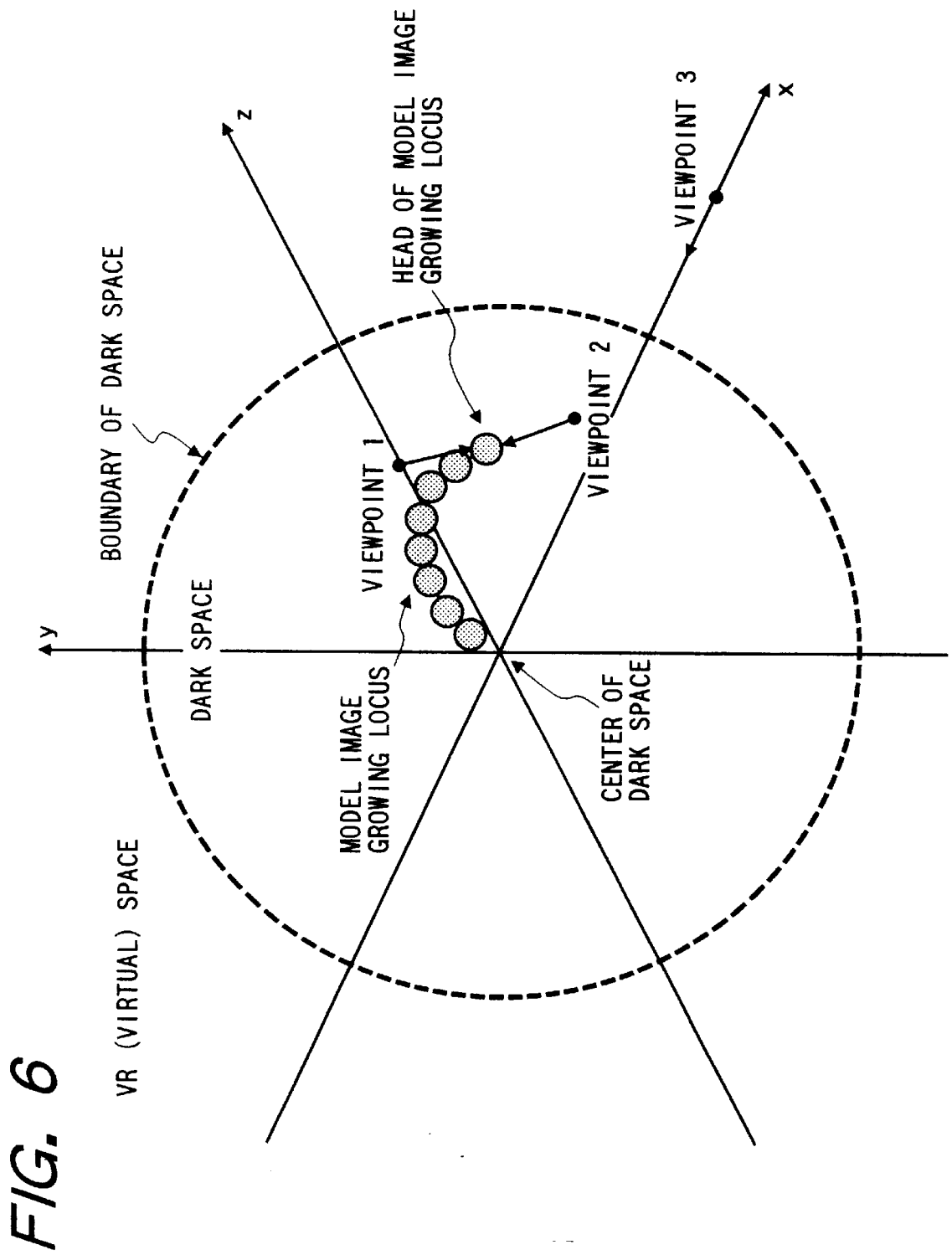
FIG. 6 is a diagram for explaining the image forming operation in a virtual space.

By executing such processes, the image model is first displayed at the viewpoint position in the 3-dimensional virtual space and the model image is formed and displayed and grows in accordance with a change in viewpoint position. Such a state is shown in FIG. 6.

That is, as shown in the diagram, the model image (solid sphere in the embodiment) is always displayed at the present viewpoint in the virtual spatial coordinates and is formed in a changing direction of the viewpoint position in accordance with the change in viewpoint position and is displayed so as to be enlarged. As shown in the diagram, the solid sphere grows in the changing direction of the viewpoint. The growth in the growing direction of the image can continue with the elapse of the observation time.

As mentioned above, the growing direction, scale, size, and shape change of the image can be controlled by the viewpoint position and the observation time. This method differs from a method whereby the image when it is seen from the viewpoint direction is displayed merely in accordance with the observing direction of the target with a predetermined shape.

Figure 7:
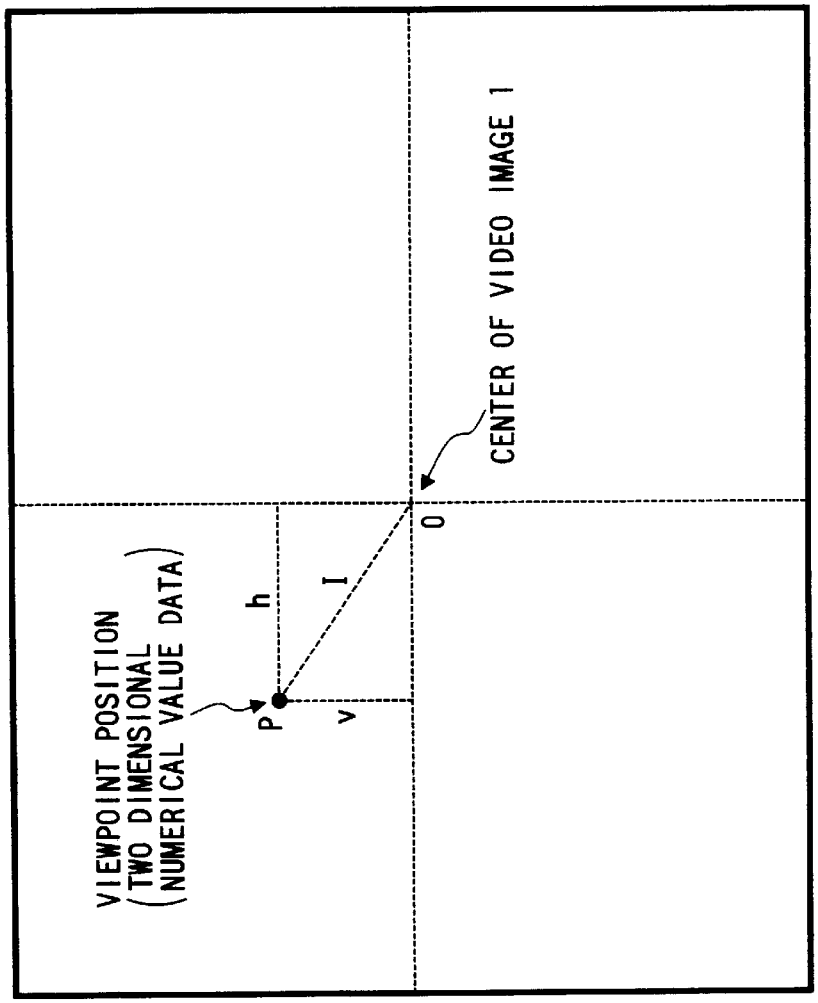
FIG. 7 is a diagram showing the relation between the viewpoint position and the image changing speed.

A growing speed of the image is made different in accordance with the viewpoint position in the picture plane in the VR space. FIG. 7 shows viewpoint position coordinates. It is now assumed as follows.

O: center of a video image 1

P: viewpoint position coordinates

I: distance between the center O of the video image and the viewpoint position P h: distance from the center O in the horizontal direction V: distance from the center O in the vertical direction In this instance, a forward speed of a change in video image increases in proportion to I.

A change in leftward/rightward rotating direction, namely, panning direction is controlled so as to increase in proportion to h. A change in the upward/downward direction, namely, tilting direction is controlled so as to increase in proportion to V.

Therefore, a changing speed of the video image is controlled so as to increase as the viewpoint position is away from the center of the video image. With this control method, a feeling that is visually natural is given to the operator and a processing speed of the computer graphics can be raised.

Figure 8:
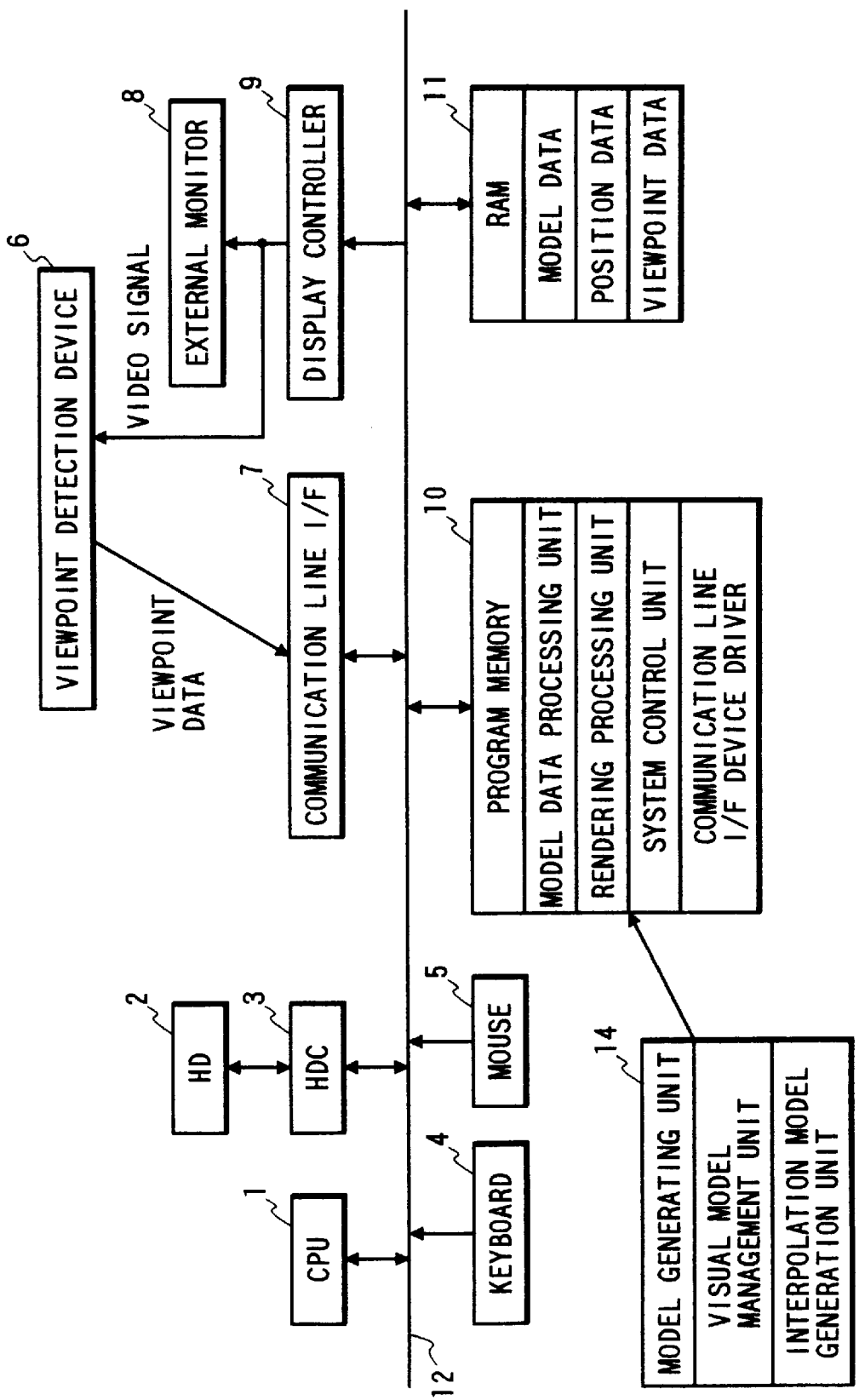
FIG. 8 is a block diagram showing a hardware construction of a computer according to the third embodiment of the invention.

FIG. 8 shows a hardware construction of the third embodiment and differs from the second embodiment of FIG. 4 with respect to a point that the model generating unit 13 is replaced to a model generation unit 14 comprising a visual model management unit for managing a visual model image and an interpolation model generation unit for interpolating intervals among a plurality of visual model images.

Figure 9:
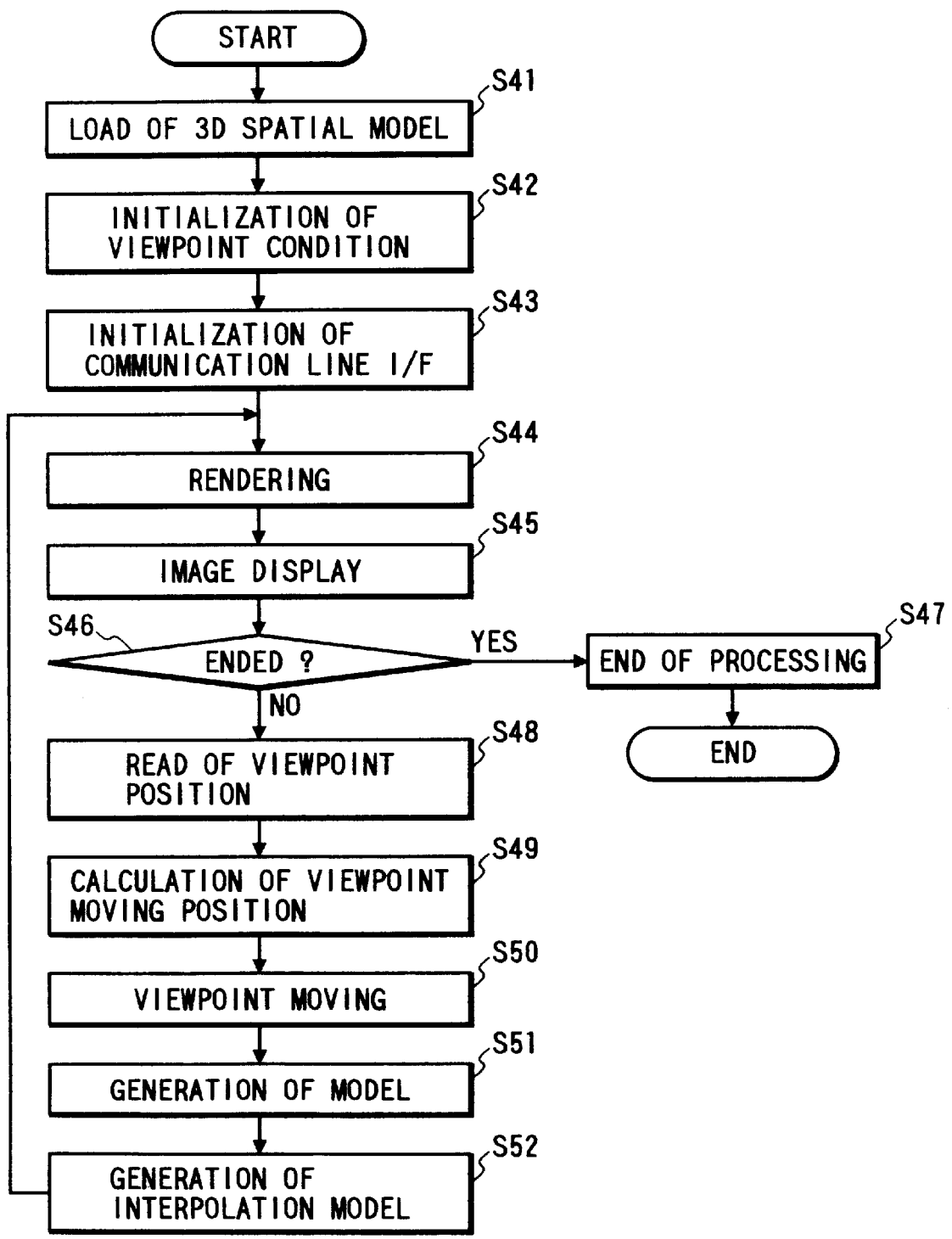
FIG. 9 is a flowchart showing processes in the computer according to the third embodiment of the invention.

FIG. 9 shows a whole flow of the present embodiment. In the diagram, processes in steps S41 to S51 are similar to those in steps S21 to S31 in the flowchart of FIG. 5 except a different point that an interpolation model generating process in step S52 is added.

That is, in the process in step S52, after a new model was generated in step S51, a distance between the generated model and the model which had been generated just before is calculated and an interval between them is interpolated by continuously generating the same model. Although a group of interpolation models are rectilinearly arranged, it is also possible to store the model generating position that is two models before and to generate interpolation models like a spline curve on the basis of the positions of three points.

According to the above process, the process as if the image continuously changes in association with the movement of the viewpoint while performing the interpolating process can be performed. It is extremely effective when executing the image process using the viewpoint information, a load of the operation to form an image according to the viewpoint position can be reduced, and it is means that is effective for computer graphics.

Figure 10:
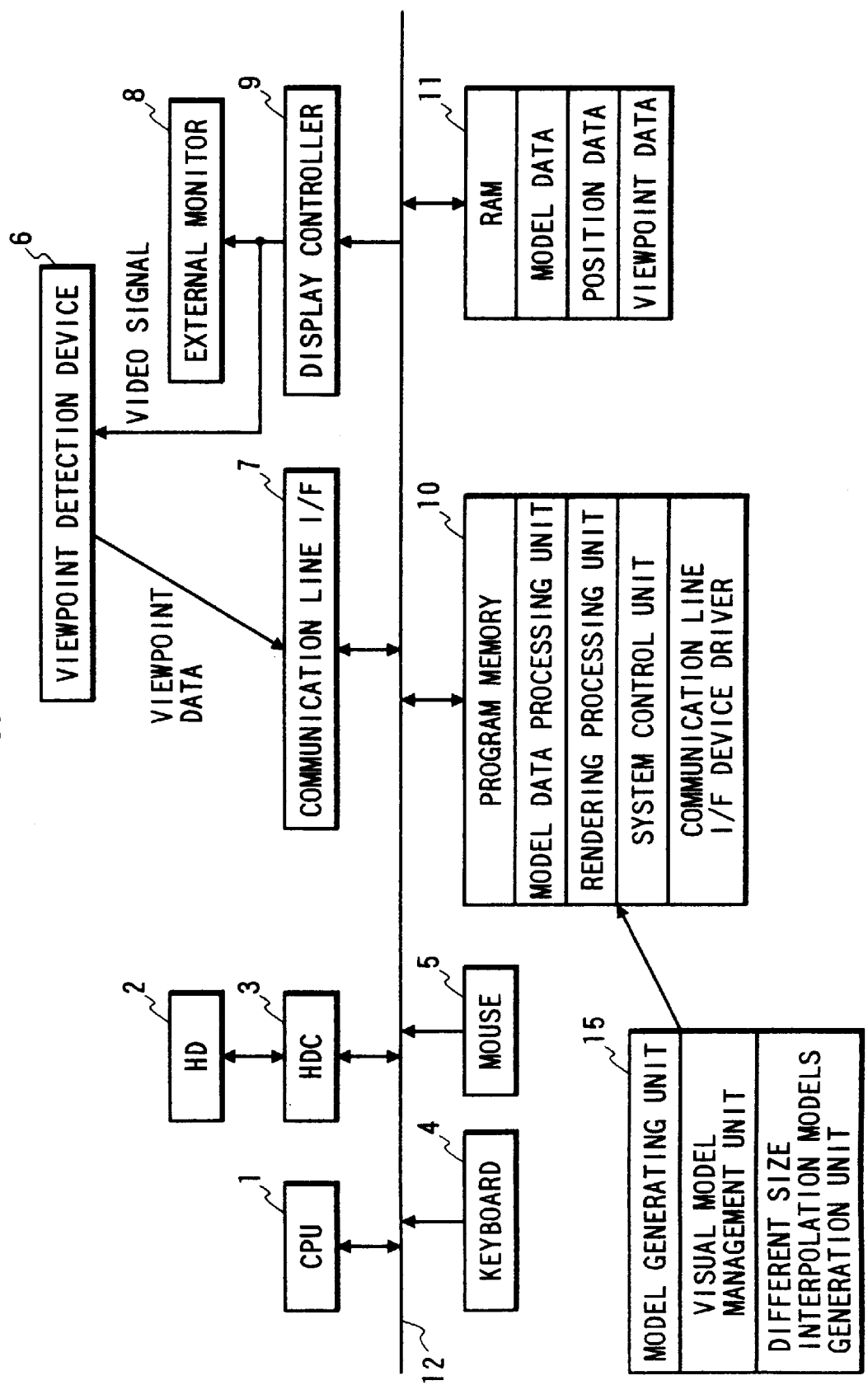
FIG. 10 is a block diagram showing a hardware construction of a computer according to the fourth embodiment of the invention.

FIG. 10 shows a hardware construction of the fourth embodiment and differs from the third embodiment of FIG. 8 with respect to a point that the model generation unit 14 in FIG. 8 is replaced to a model generation unit 15 comprising a visual model management unit for managing visual model images and an interpolation model generation unit for interpolating intervals among a plurality of visual model images.

Figure 11:
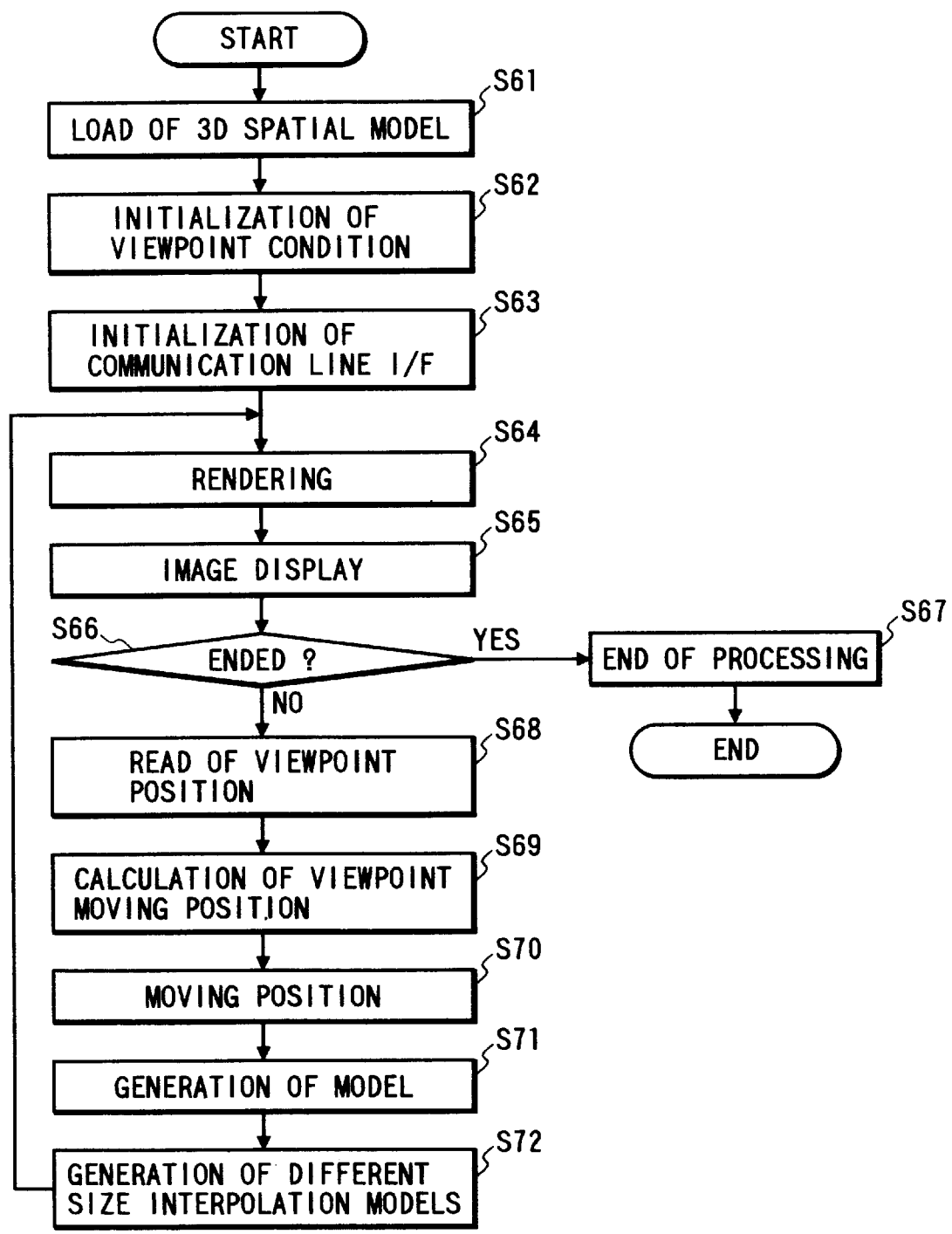
FIG. 11 is a flowchart showing processes in the computer according to the fourth embodiment of the invention.

FIG. 11 shows a whole flow of the present embodiment. In the diagram, processes in steps S61 to S71 are similar to those in steps S41 to S51 in the flowchart of FIG. 9 except a point that the contents of an interpolation model generating process in step S72 are different.

That is, according to the process in step S72, a group of interpolation models which are continuously generated change at random with sizes in a predetermined range (the range is specified by an initial value). According to this process, a process such that the image continuously changes in association with the movement of the viewpoint while the size changes at random while performing the interpolating process can be performed. It is extremely effective when performing the image process using viewpoint information and computer graphics.

In each of the above second to fourth embodiments, the group of models generated can be made invisible at an arbitrary time. The setting about whether they are made invisible or not can be changed by inputting from a keyboard or mouse of the system.

A specific construction of the viewpoint detection device 6 will now be described.

FIGS. 12A to 12C, 13A, and 13B are cross sectional views of video image observing means and viewpoint detecting means arranged in the viewpoint detection device 6. The viewpoint detecting means comprises: illuminating means (IRED) 103 for irradiating an infrared ray to an eyeball 106; a viewpoint optical system for forming an image of an infrared reflection light from the eyeball 106; and an image pickup device (CCD) 105. The viewpoint optical system is constructed by a prism type ocular lens 101 and an image forming lens system 104. Since the illuminating means (IRED) 103 exists, an imaginary image (Purkinje image) of the IRED 103 by a reflecting surface of a cornea of the eyeball is formed.

Figures 12A, 12B:
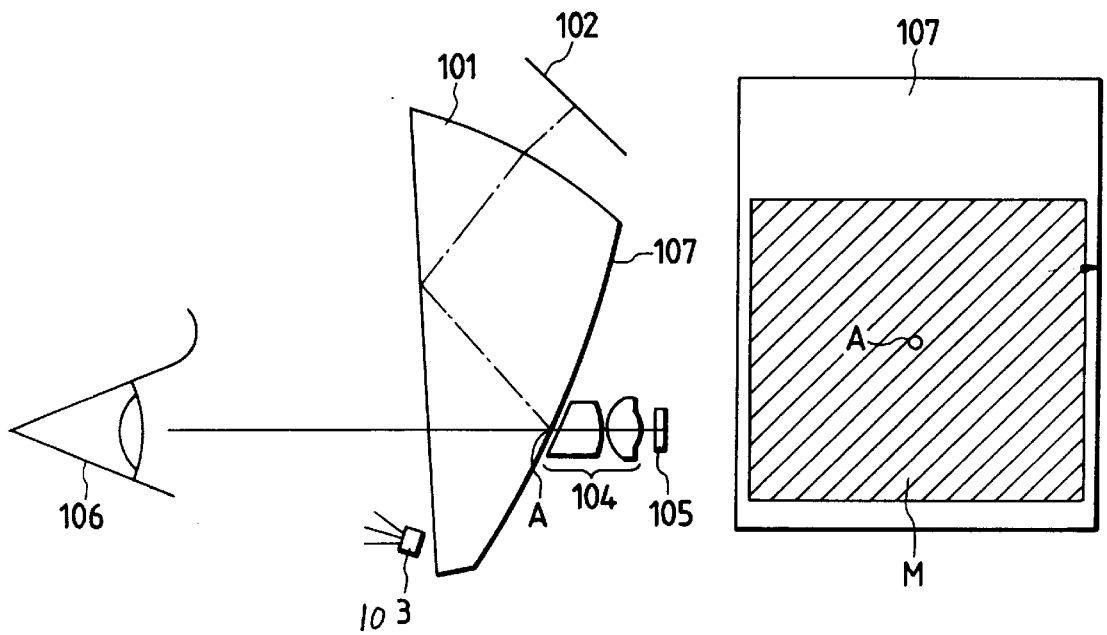
FIGS. 12A, 12B and 12C are diagrams showing a construction of an optical system which is used in each of the above embodiments of the invention.

In FIG. 12A, the illuminating means (IRED) 103 is arranged between the eyeball 106 and the prism type ocular lens 101 and are set so as not to obstruct the light from a small liquid crystal display 102. With this structure, a CCD image of the eyeball with little ghost image can be obtained and a viewpoint detecting precision rises.

Figure 13A:
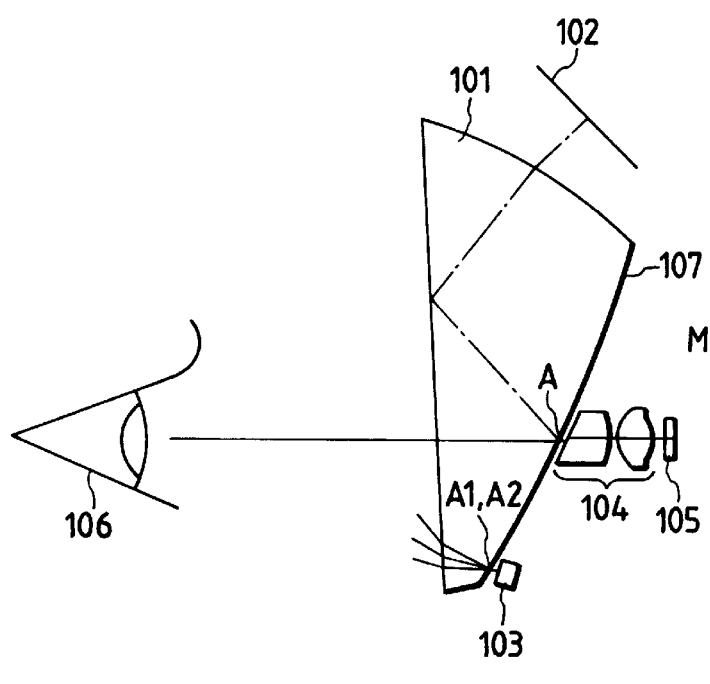
FIGS. 13A and 13B are diagrams showing a construction of another modification of an optical system which is used in each embodiment of the invention.

In FIG. 13A, the illuminating means (IRED) 103 is arranged on the side opposite to the eyeball 106 for the prism type ocular lens 101. With this layout, the illuminating means (IRED) 103 can be set at an arbitrary position without being influenced by an optical path of the light from the small liquid crystal display 102.

Figure 12C:
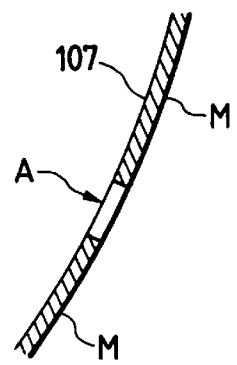
Figure 13B:
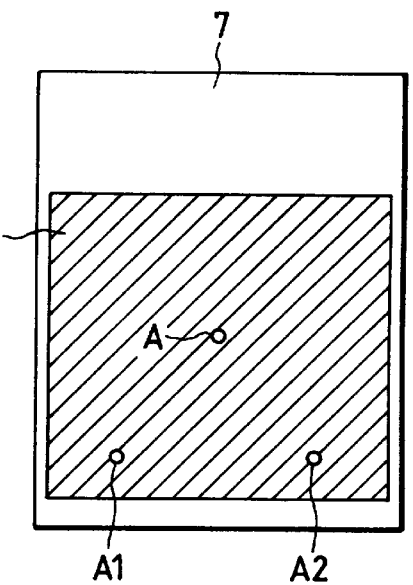

Since video image observing means comprises the small liquid crystal display (LCD) 102 and prism type ocular lens 101 as shown in FIGS. 12A and 13A, it is formed in a compact size. A state of a micro diaphragm A of the viewpoint optical system existing in the optical path of the prism type ocular lens 1 is shown in FIGS. 12B, 12C, and 13B.

The micro diaphragm A has a diameter of about $\phi 0.2$ to $\phi 2$. A visible light cut lens or a visible light cut filter is included between the micro diaphragm A and CCD 105 and only the infrared ray is led to the CCD 105. With this structure, a dichroic mirror and a dichroic prism in the viewpoint optical system are made unnecessary (there will be no problem even if the micro diaphragm A is used as a dichroic mirror).

Figure 14:
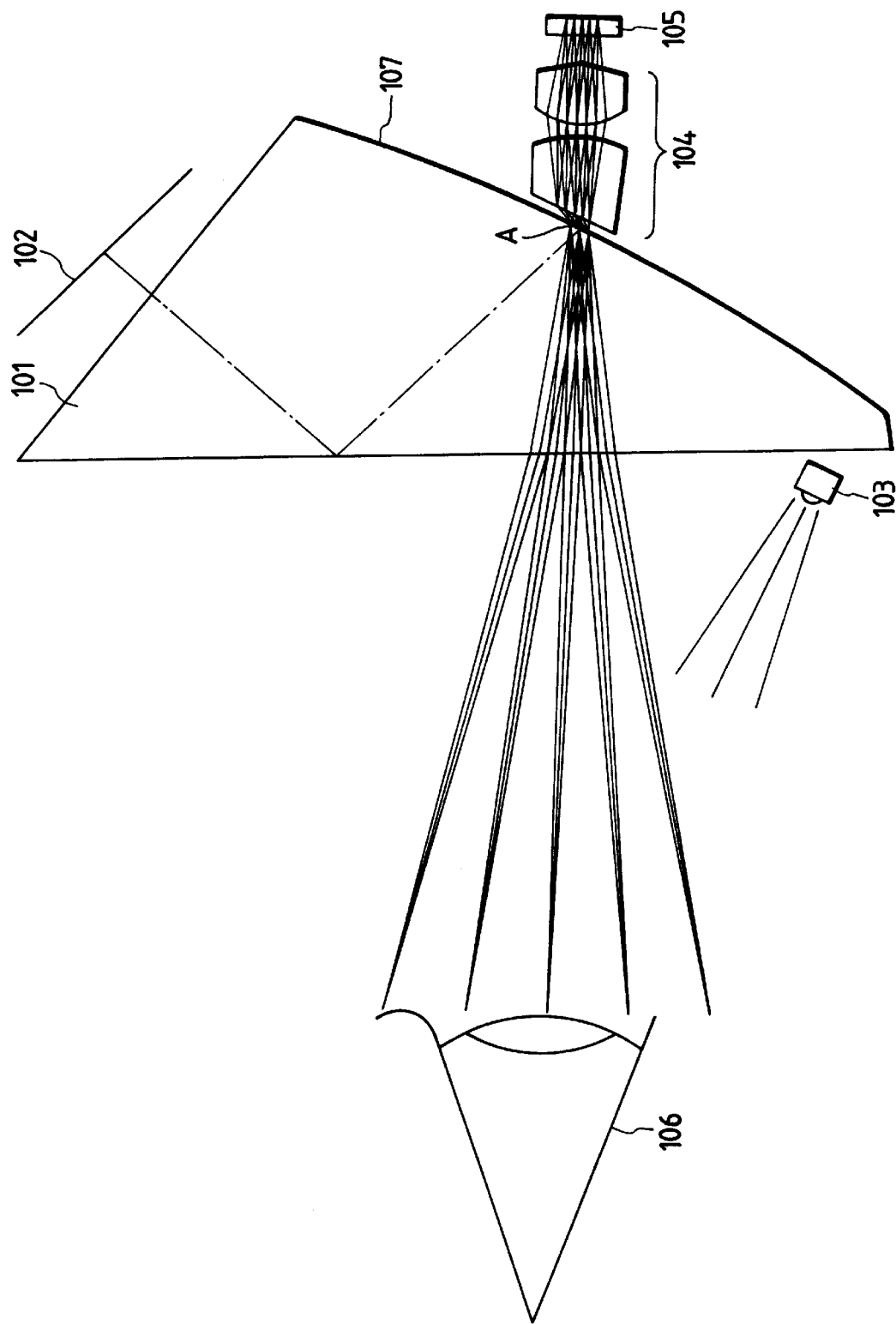
FIG. 14 is a trace cross sectional diagram of a viewpoint optical system in the optical systems in FIGS. 12A, 12B, 12C, 13A and 13B.

FIG. 14 is a viewpoint optical system trace diagram in the case where the micro diaphragm A exists in the optical path of the prism type ocular lens 101 and shows that a beam diameter is smallest at the position of the micro diaphragm A.

Since the micro diaphragm A in which the beam in the viewpoint optical system is smallest is set in the optical path of the prism type ocular lens 101, an influence on the video image observing means is minimized. Therefore, even if a dichroic mirror is not used, the influence on the video image observing means can be ignored. However, when the diaphragm A is provided out of the optical path of the prism type ocular lens 101, a beam area is widened at the emitting surface where the infrared beam from the eyeball is emitted through the prism type ocular lens 1 (because beam diameters at positions before and after the diaphragm A are increased), the influence on the video image observing means cannot be ignored and the dichroic mirror is necessary.

When the micro diaphragm A exists in the optical path of the prism type ocular lens 101, since the micro diaphragm A, image forming lens system 104, and CCD 105 can be arranged just after the prism type ocular lens 101, the system can be miniaturized. However, when the diaphragm A exists out of the optical path of the prism type ocular lens 101, since the optical path length of the viewpoint optical system is increased by only the distance from the prism type ocular lens 101 to the diaphragm A, the system enlarges in size.

FIGS. 12A, 12C, and 13B show a state of a reflecting surface 107 of the prism type ocular lens 101. A region of M corresponds to a 100% reflecting surface and A, A1, and A2 indicate aperture micro diaphragms which don't have a reflecting function. As viewpoint detecting means, the infrared ray from the IRED 103 transmits the aperture micro diaphragms ($\phi 0.5$ to $\phi 3$) of A1 and A2 and irradiates the eyeball (in FIG. 12A, there is no aperture minimum diaphragm and the direct eyeball radiation is performed), and the infrared reflection light from the eyeball transmits the aperture micro diaphragm A (φ0.2 to φ2) and is formed as an image onto the CCD. In the video image observing means, the visible light from the LCD 102 enters the prism type ocular lens 101 and the light beam is folded by the reflecting surface 107 and another reflecting surface and emits the prism type ocular lens 101 and is led to the eyeball.

In this instance, the visible light from the LCD 102 is not reflected but transmits the aperture micro diaphragms of A, A1, and A2 on the reflecting surface 107. However, since the aperture micro diaphragms are very close to the eyeball, they are blurred and since their diameters are small, they are hardly seen, so that the influence on the video image observing means can be ignored. With such a structure, an enlargement magnification and an eye point of the ocular optical system can be set independent of the viewpoint optical system and the ocular optical system can be made compatible with the compact viewpoint optical system of low costs.

Obviously, there is no need to construct the aperture micro diaphragms of A, A1, and A2 by dichroic mirrors, if they are constructed by dichroic mirrors which reflect the visible light and transmit the infrared ray, the visible light from the LCD 102 is not transmitted by the aperture micro diaphragms of A, A1, and A2 on the reflecting surface 107 but the whole visible light is led to the eyeball. In case of constructing in a manner such that no aperture micro diaphragm is provided for the reflecting surface 107 but the whole region is set to the dichroic mirror which reflects the visible light and transmits the infrared ray and the aperture micro diaphragm A is arranged at a position near the optical path of the prism type ocular lens 1, the whole visible light from the LCD 102 is led to the eyeball. Although the costs in both of the above cases are high, the ocular optical system can be made compatible with the compact viewpoint optical system without sacrificing the enlargement magnification or eye point of the ocular optical system.

Figure 15A:
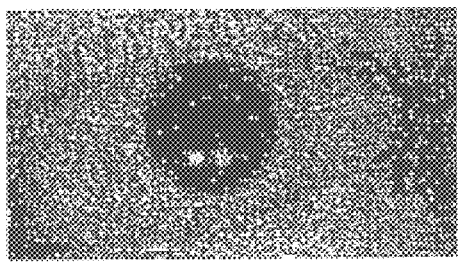
FIGS. 15A and 15B are diagrams showing eyeball CCD images in viewpoint detecting means.
Figure 15B:
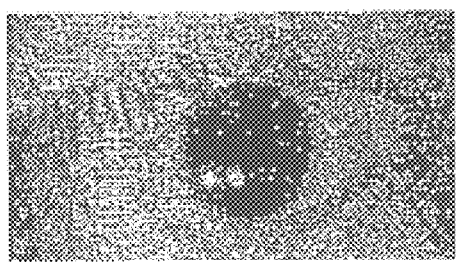

FIGS. 15A and 15B show CCD images formed by the viewpoint optical system. In FIG. 15A, a center large black circular portion indicates a pupil and two white points in the pupil indicate imaginary images (Purkinje images) by the cornea surface reflection of two IRED light sources 103.

Since a change in relative positional relation between the center of the pupil and the Purkinje image has a proportional relation with a rotational angle of the eyeball, necessary position information is calculated and extracted by an image process. Although it is sufficient to use one IRED 103 in principle, two IREDs 103 are used because of reasons on illumination and information process.

FIG. 15B shows the CCD image when the optical axis of the eyeball is moved to the left. There is also a case where another set of IREDs are provided for a person using glasses.

Figure 16:
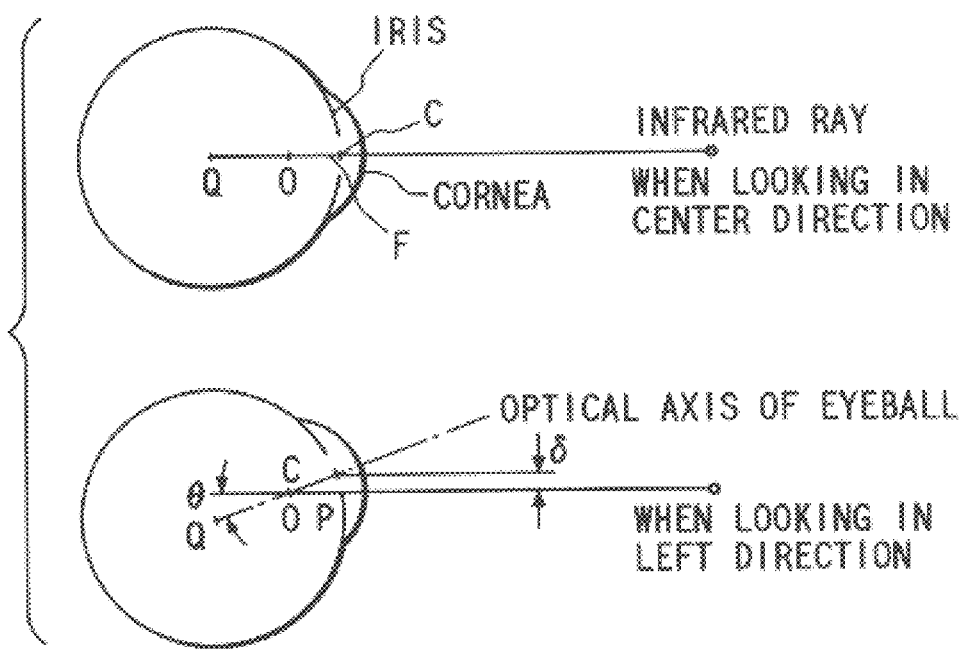
FIG. 16 is a principle diagram in the viewpoint detecting means.

FIG. 16 shows a principle for obtaining the rotational angle of the eyeball in the horizontal cross sectional view of the eyeball. In FIG. 16, C: center of pupil
P: Purkinje image
O: center of curvature of cornea
Q: rotational center of the eyeball
θ: rotational angle of the eyeball
δ: deviation amount between the Purkinje image and the center of the pupil.

When the eyes looks at the center, since there is no rotation of the eyeballs, the Purkinje image and the center of the pupil overlap and δ=0 and θ=0. When the eyes looks at leftward (rightward), since the eyeballs rotate, a deviation occurs between the Purkinje image and the center of the pupil and the relation between the deviation amount δ and the rotational angle θ of the eyeball is $$\delta = OC \times \sin\theta$$

θ can be obtained by the above equation. The viewpoint can be detected at a high precision by such a viewpoint detecting principle.

According to the foregoing embodiments as mentioned above, by applying the viewpoint detection information to the 3-dimensional virtual space, the instructing method in case of moving on the virtual 3-dimensional space is extremely close to the actuality, a walk through that is near the human sense is possible, and the moving position and the moving route can be also stereoscopically grasped. The apparatus itself including the video image observing means and viewpoint detecting means is not so large and low costs can be realized.

According to the above embodiments, the viewpoint detection information can be fed back to the virtual 3-dimensional space, the virtual 3-dimensional space can be changed by the viewpoint, and a walk through that is close to the human sense is possible.

According to the above embodiments, when moving on the virtual 3-dimensional space, the moving position and the moving route in the virtual 3-dimensional space can be stereoscopically gasped, a continuous image such as 3-dimensional map or locus can be easily expressed, and a video image of a powerful expression can be displayed instead of a simple rectilinear locus.

According to the above embodiments, since the display mode of the locus which moved on the virtual 3-dimensional space can be switched between the visible mode and the invisible mode, a situation such that it makes it hard to see the object in the virtual space doesn't occur and the display without a feeling of disorder can be performed.

According to the above embodiments, the viewpoint in the virtual 3-dimensional space can be detected.

According to the above embodiments, in a camera, since the diaphragm of the viewpoint optical system exists out of the optical path of the ocular optical system, the dichroic mirror and dichroic prism are certainly necessary to lead the non-visual light from the eyeball to the viewpoint optical system. However, according to the above embodiments of the invention, since the micro diaphragm of the viewpoint optical system exists in the optical path of the ocular optical system, the compact viewpoint detection system of low costs can be realized without needing the dichroic mirror and dichroic prism.

Since an enlarged imaginary image of the video image display means is formed by the display means and the ocular optical system and is observed, the apparatus itself of a small size and a light weight can be realized. The video display means can be made compatible with the compact viewpoint detecting means of a high precision without sacrificing the video image display means for displaying the virtual 3-dimensional space.

According to the above embodiments, the instructing method in case of moving on the virtual 3-dimensional space is extremely close to the actuality and a walk through near the human sense is possible. There are also effects such that a size of apparatus including the video image observing means is not enlarged and low costs can be realized.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing apparatus using a viewpoint detection, comprising:
   a display capable of displaying a virtual 3-dimensional spatial image into a field of view;
   a viewpoint detector, positioned to detect a viewpoint position of an operation on the displayed virtual 3-dimensional spatial image by sensing an image of an eyeball; and
   an image processor arranged to provide signals for displaying an image on said display, said image processor changing said image in accordance with the viewpoint position detected by said viewpoint detector.

2. An apparatus according to claim 1, wherein the image which is displayed on said display is a virtual 3-dimensional spatial image and said image processor changes said virtual 3-dimensional spatial image in accordance with a direction of said viewpoint.

3. An apparatus according to claim 2, wherein said image processor includes a memory in which a predetermined image has been stored, can arbitrarily move an observation viewpoint in said virtual 3-dimensional spatial image in accordance with the direction of the viewpoint, and newly generates the image read out from said memory at a position near the moved observation viewpoint position.

4. An apparatus according to claim 3, wherein said image processor can arbitrarily move the observation viewpoint in said virtual 3-dimensional spatial image and executes processes for generating an image at a position near the moved observation viewpoint position and generating a plurality of same images into an interval between said generated image and the image generated at the position near said observation viewpoint position just before said image, thereby forming a continuous image.

5. An apparatus to claim 4, wherein said image processor includes a continuous-object generator which generates a plurality of objects of different sizes into an interval between the generated object and the object generated at a position near said observation viewpoint position just before said object.

6. An apparatus according to claim 5, wherein said image processor has means for making the generated image visible or invisible.

7. An image processing apparatus using a viewpoint detection, comprising:
   display means for displaying a virtual 3-dimensional spatial image into a field of view;
   viewpoint detecting means for detecting a viewpoint position of an operator in said field of view; and
   image processing means for displaying an image on said display means and changing said image in accordance with the viewpoint position detected by said viewpoint detecting means,
   wherein said viewpoint detecting means has illuminating means for irradiating an invisible light to an eyeball and a viewpoint optical system and an image pickup device for forming an image of the invisible light from the eyeball.

8. An image processing apparatus using a viewpoint detection, comprising:
   display means for displaying a virtual 3-dimensional spatial image into a field of view;
   viewpoint detecting means for detecting a viewpoint position of an operator in said field of view; and
   image processing means for displaying an image on said display means and changing said image in accordance with the viewpoint position detected by said viewpoint detecting means,
   wherein the image which is displayed on said display means is a virtual 3-dimensional spatial image and said image processing means changes said virtual 3-dimensional spatial image in accordance with a direction of said viewpoint, and
   wherein said viewpoint detecting means has illuminating means for irradiating an invisible light to an eyeball and a viewpoint optical system and an image pickup device for forming an image of the invisible light from the eyeball.

9. An apparatus according to claim 7, further comprising an ocular optical system for enlarging the image displayed on said display means, and wherein a micro diaphragm of said viewpoint optical system is provided in an optical path of said ocular optical system.

10. An apparatus according to claim 8, further comprising an ocular optical system for enlarging the image displayed on said display means, and wherein a micro diaphragm of said viewpoint optical system is provided in an optical path of said ocular optical system.

11. An apparatus according to claim 9, wherein said diaphragm of said viewpoint optical system is provided on a reflecting surface in said ocular optical system, the invisible light from the eyeball transmits the micro diaphragm of said viewpoint optical system and is formed as an image onto the image pickup device by an image forming lens system, and the light from the video image display means is reflected by the reflecting surface in said ocular optical system and is led to the eyeball.

12. An apparatus according to claim 10, wherein said diaphragm of said viewpoint optical system is provided on a reflecting surface in said ocular optical system, the invisible light from the eyeball transmits the micro diaphragm of said viewpoint optical system and is formed as an image onto the image pickup device by an image forming lens system, and the light from the video image display means is reflected by the reflecting surface in said ocular optical system and is led to the eyeball.

13. An apparatus according to claim 7, wherein said viewpoint detecting means calculates a relative position between the center of a pupil of the eyeball in image data which is obtained from said image pickup device and an imaginary image (Purkinje image) by a reflecting surface of a cornea of said illuminating means by an image process, thereby detecting a viewpoint direction of the eyeball.

14. An apparatus according to claim 8, wherein said viewpoint detecting means calculates a relative position between the center of a pupil of the eyeball in image data which is obtained from said image pickup device and an imaginary image (Purkinje image) by a reflecting surface of a cornea of said illuminating means by an image process, thereby detecting a viewpoint direction of the eyeball.

15. An apparatus according to claim 9, wherein said viewpoint detecting means calculates a relative position between the center of a pupil of the eyeball in image data which is obtained from said image pickup device and an imaginary image (Purkinje image) by a reflecting surface of a cornea of said illuminating means by an image process, thereby detecting a viewpoint direction of the eyeball.

16. An apparatus according to claim 10, wherein said viewpoint detecting means calculates a relative position between the center of a pupil of the eyeball in image data which is obtained from said image pickup device and an imaginary image (Purkinje image) by a reflecting surface of a cornea of said illuminating means by an image process, thereby detecting a viewpoint direction of the eyeball.

17. An apparatus according to claim 11, wherein said viewpoint detecting means calculates a relative position between the center of a pupil of the eyeball in image data which is obtained from said image pickup device and an imaginary image (Purkinje image) by a reflecting surface of a cornea of said illuminating means by an image process, thereby detecting a viewpoint direction of the eyeball.

18. An apparatus according to claim 12, wherein said viewpoint detecting means calculates a relative position between the center of a pupil of the eyeball in image data which is obtained from said image pickup device and an imaginary image (Purkinje image) by a reflecting surface of a cornea of said illuminating means by an image process, thereby detecting a viewpoint direction of the eyeball.

19. An image processing apparatus using a viewpoint detection, comprising:

a display for displaying a virtual 3-dimensional spatial image into a field of view;

a viewpoint detector, arranged to detect a viewpoint position of an operator on the displayed virtual 3-dimensional spatial image by sensing an image of an eyeball; and an image processor that provides signals for displaying an image on said display and growing said image in accordance with a viewpoint position on the displayed virtual 3-dimensional spatial image detected by said viewpoint detector and an observation time.

20. An apparatus according to claim 19, wherein said image which is displayed on said display is a virtual 3-dimensional spatial image, and said image processor changes said virtual 3-dimensional spatial image in accordance with a direction of said viewpoint.

21. An apparatus according to claim 19, wherein said viewpoint detector includes coordinates converting means for detecting a viewpoint position of the operator in said field of view on 2-dimensional coordinates and converting into a coordinate system of said 3-dimensional space.

22. An apparatus according to claim 20, wherein said image processor includes a memory in which a predetermined image has been stored and can arbitrarily move an observation viewpoint in said virtual 3-dimensional spatial image in accordance with the direction of the viewpoint and newly generates the image read out from said memory at a position near the moved observation viewpoint position.

23. An apparatus according to claim 19, wherein said image processor makes a displacement speed of said image different in accordance with the viewpoint position in a picture plane detected by said viewpoint detector.

24. An apparatus according to claim 21, wherein said image processor makes a displacement speed of said image different in accordance with the viewpoint position in a picture plane detected by said viewpoint detector.

25. An apparatus according to claim 23, wherein said image processor is constructed in a manner such that the displacement speed of said image rises as the viewpoint position in the picture plane detected by said viewpoint detector approaches a periphery of the picture plane.

26. An apparatus according to claim 24, wherein said image processor is constructed in a manner such that the displacement speed of said image rises as the viewpoint position in the picture plane detected by said viewpoint detector approaches a periphery of the picture plane.

27. An apparatus according to claim 22, wherein said image processor can arbitrarily move an observation viewpoint to said virtual 3-dimensional spatial image in accordance with the direction of the viewpoint and executes processes for generating an image at a position near the moved observation viewpoint position and generating a plurality of same images into an interval between the generated image and the image generated at a position near said observation viewpoint position just before said image, thereby forming a continuous image.

28. An apparatus according to claim 27, wherein said image processor has means for generating a plurality of objects of different sizes into an interval between the generated object and the object generated at the position near said observation viewpoint position just before said object, thereby generating a continuous object.

29. An image processing method using a viewpoint detection, comprising:

a display step, of displaying a virtual 3-dimensional spatial image into a field of view;

a viewpoint detecting step, of detecting a viewpoint position of an operator on the displayed virtual 3-dimensional spatial image by sensing an image of an eyeball; and an image processing step, of displaying an image in said display step and changing the image in accordance with the viewpoint position detected in said viewpoint detecting step.

30. A method according to claim 29, wherein the image which is displayed in said display step is a virtual 3-dimensional spatial image and said image processing step includes changing the virtual 3-dimensional spatial image in accordance with a direction of the viewpoint.

31. A method according to claim 30, wherein said image processing step includes controlling a memory in which a predetermined image has been stored, arbitrarily moving an observation viewpoint in the virtual 3-dimensional spatial image in accordance with the direction of the viewpoint, and newly generating the image read out from the memory at a position near the moved observation viewpoint position.

32. A method according to claim 31, wherein said image processing step includes arbitrarily moving the observation viewpoint in the virtual 3-dimensional spatial image and executing processes for generating an image at a position near the moved observation viewpoint position and generating a plurality of same images into an interval between the generated image and the image generated at the position near the observation viewpoint position just before said the image, thereby forming a continuous image.

33. A method according to claim 32, wherein said image processing step includes generating a continuous object by generating a plurality of objects of different sizes into an interval between the generated object and the object generated at a position near the observation viewpoint position just before the object.

34. A method according to claim 33, wherein said image processing step includes making the generated image visible or invisible.

35. An apparatus according to claim 29, wherein said viewpoint detecting step includes irradiating an eyeball, a viewpoint optical system and an image pickup device with invisible light for forming an image of the invisible light from the eyeball.

* * * * *

UNITED STATES PATENT AND TRADEMARK OFFICE
CERTIFICATE OF CORRECTION

PATENT NO.    : 6,130,672  
DATED         : October 10, 2000  
INVENTOR(S)   : Shoichi Yamazaki et al.

Page 1 of 1

It is certified that error appears in the above-identified patent and that said Letters Patent is hereby corrected as shown below:

Title page,
Item [56] REFERENCES CITED, ATTORNEY, AGENT OR FIRM

"Fitzpatrick Cella Harper & Scinto" should read -- Fitzpatrick, Cella, Harper & Scinto --.

Column 4,
Line 60, "time;" should read -- time; and --;
Line 63, "depressed;" should read -- depressed, --.

Column 9,
Line 62, "pupil." should read -- pupil --;
Line 63, "looks" should read -- look --;
Line 65, "looks at" should read -- look --.

Column 10,
Line 15, "be also" should read -- also be --;
Line 13, "walk through" should read -- walk-through --.

Column 14,
Line 48, "the" (second occurrence) should be deleted.

Signed and Sealed this

Thirteenth Day of November, 2001

Attest:

*Nicholas P. Godici*

NICHOLAS P. GODICI
*Attesting Officer*    *Acting Director of the United States Patent and Trademark Office*